(12) United States Patent
Zhang

(10) Patent No.: US 12,526,840 B2
(45) Date of Patent: Jan. 13, 2026

(54) LISTEN BEFORE TALK (LBT) TECHNIQUES

(71) Applicant: ZTE Corporation, Guangdong (CN)

(72) Inventor: Li Zhang, Guangdong (CN)

(73) Assignee: ZTE Corporation, Guangzhou (CN)

( * ) Notice: Subject to any disclaimer, the term of this patent is extended or adjusted under 35 U.S.C. 154(b) by 305 days.

(21) Appl. No.: 18/455,210

(22) Filed: Aug. 24, 2023

(65) Prior Publication Data

US 2023/0413323 A1    Dec. 21, 2023

Related U.S. Application Data

(63) Continuation of application No. PCT/CN2021/106979, filed on Jul. 19, 2021.

(51) Int. Cl.
*H04W 74/0808* (2024.01)
*H04W 72/0457* (2023.01)
*H04W 74/0833* (2024.01)

(52) U.S. Cl.
CPC ... *H04W 74/0808* (2013.01); *H04W 72/0457* (2023.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,980,059 | B1 * | 4/2021 | Babaei | H04W 80/02 |
| 2019/0013909 | A1 * | 1/2019 | Li | H04L 5/0048 |
| 2020/0252821 | A1 * | 8/2020 | Deogun | H04W 76/19 |
| 2020/0329497 | A1 * | 10/2020 | Dinan | H04L 41/0654 |
| 2020/0367284 | A1 * | 11/2020 | Lei | H04W 74/0841 |
| 2021/0007146 | A1 * | 1/2021 | Agiwal | H04W 24/04 |
| 2021/0100031 | A1 | 4/2021 | Cirik et al. | |
| 2021/0203400 | A1 * | 7/2021 | Babaei | H04W 52/36 |
| 2021/0298081 | A1 * | 9/2021 | Babaei | H04B 7/0695 |
| 2021/0337592 | A1 * | 10/2021 | Kunt | H04W 74/0833 |

(Continued)

FOREIGN PATENT DOCUMENTS

| | | | | | |
|---|---|---|---|---|---|
| CN | 107046732 | A | * | 8/2017 | H04L 5/0048 |
| CN | 111836400 | A | * | 10/2020 | H04W 74/0833 |
| EP | 3925283 | B1 | * | 6/2024 | H04W 72/0453 |

(Continued)

OTHER PUBLICATIONS

Chinese Patent Office, International Search Report & Written Opinion for Appl. No. PCT/CN2021/106979, mailed on Mar. 1, 2022, 9 pages.

(Continued)

*Primary Examiner* — Andrew C Oh
(74) *Attorney, Agent, or Firm* — Perkins Coie LLP

(57) ABSTRACT

Techniques are described to perform listen before talk (LBT). An example wireless communication method includes receiving, by a communication node, an indication of one or more reference signals configured by a network node; and performing a failure recovery procedure upon determining that a number of listen before talk (LBT) failures reached a threshold, where the communication node determines that an LBT failure has occurred in response to determining that an LBT operation has failed for transmitting, in an active bandwidth part (BWP), a beam that includes a reference signal from the one or more reference signals.

20 Claims, 4 Drawing Sheets

(56) References Cited

U.S. PATENT DOCUMENTS

2022/0330173 A1* 10/2022 Matsumura ........... H04L 5/0051

FOREIGN PATENT DOCUMENTS

| WO | WO-2019245779 A1 * | 12/2019 | ............ H04W 72/23 |
| WO | WO-2021028871 A1 * | 2/2021 | .......... H04W 36/305 |
| WO | 2021/062654 A1 | 4/2021 | |
| WO | WO-2021064090 A1 * | 4/2021 | ............ H04W 76/18 |
| WO | 2021/086246 A1 | 5/2021 | |
| WO | WO-2021084516 A1 * | 5/2021 | ........ H04W 74/0808 |
| WO | WO-2021156822 A1 * | 8/2021 | ........ H04W 74/0808 |
| WO | WO-2022116077 A1 * | 6/2022 | .......... H04W 74/002 |

OTHER PUBLICATIONS

Ericsson R2-1913504 "Handling LBT failures" 3GPP tsg_ran\wg2_r12 Oct. 3, 2019 (Mar. 10, 2019), 7 pages.
Extended European Search Report for co-pending EP Appl. No. 21950388.5, mailed on Feb. 22, 2024, 10 pages.
Ericsson "Further analysis of active BWP switching in NR-U" 3GPP TSG RAN WG4 Meeting #93 Reno, USA, Nov. 18-22, 2019, R4-1915008, 3 pages.
Ericsson "Email discussion summary for [95e][204] NR_unlic_RRM_1" 3GPP TSG-RAN WG4 Meeting# 95-e Electronic Meeting, May 25-Jun. 5, 2020, R4-2009250, 67 pages.
MediaTek Inc. "Email discussion summary for [94e Bis] [105] NR_unlic_RRM_Core_Part 2" 3GPP TSG-RAN WG4 Meeting# 94-e-Bis Electronic Meeting, Apr. 20-30 , 2020, R4-2005839, 51 pages.

* cited by examiner

LISTEN BEFORE TALK (LBT) TECHNIQUES

CROSS-REFERENCE TO RELATED APPLICATION

This application is a continuation and claims priority to International Application No. PCT/CN2021/106979, filed on Jul. 19, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for listen before talk (LBT) for one or more transmission beams.

An example wireless communication method includes receiving, by a communication node, an indication of one or more reference signals configured by a network node; and performing a failure recovery procedure upon determining that a number of listen before talk (LBT) failures reached a threshold, wherein the communication node determines that an LBT failure has occurred in response to determining that an LBT operation has failed for transmitting, in an active bandwidth part (BWP), a beam that includes a reference signal from the one or more reference signals.

In some embodiments, the communication node performs the failure recovery procedure by selecting other BWPs with random access channel (RACH) resources to transmit information. In some embodiments, the method further includes determining that an LBT failure has occurred in the other BWPs in response to determining that the LBT operation has failed for transmitting, in each of the other BWPs, a beam that includes a reference signal from the one or more reference signals; and transmitting, by the communication node and in response to the determining, a message to the network node, wherein the message indicates that LBT failures are detected on a plurality of BWPs comprising the active BWP and the other BWPs. In some embodiments, the communication node performs the failure recovery procedure by performing random access. In some embodiments, the communication node performs the random access using a transmission beam indicated by the network node to the communication node. In some embodiments, the one or more reference signals include one or more sounding reference signals (SRSs).

Another example wireless communication method includes determining, by a communication node, one or more reference signals or one or more channels with which to determine a listen before talk (LBT) failure; and performing a failure recovery procedure upon determining that a number of LBT failures reached a threshold, wherein the communication node determines that an LBT failure has occurred in an active bandwidth part (BWP) in response to: (1) determining that an LBT operation has failed for and transmitting, in an active bandwidth part (BWP), a first beam that includes a reference signal from the one or more reference signals, or (2) determining that the LBT operation has failed for transmitting, in the active BWP, a second beam corresponding to a channel from the one or more channels.

In some embodiments, the communication node performs the failure recovery procedure by selecting other BWPs with random access channel (RACH) resources to transmit information. In some embodiments, the method further includes determining that an LBT failure has occurred in the other BWPs in response to determining that the LBT operation has failed for transmitting, in each of the other BWPs, a beam that (1) includes a reference signal from the one or more reference signals or (2) corresponds to a channel from the one or more channels; and transmitting, by the communication node and in response to the determining, a message to the network node, wherein the message indicates that LBT failures are detected on a plurality of BWPs comprising the active BWP and the other BWPs. In some embodiments, the communication node performs the failure recovery procedure by performing random access. In some embodiments, the communication node performs the random access using a transmission beam indicated by the network node to the communication node. In some embodiments, the one or more reference signals include one or more sounding reference signals (SRSs). In some embodiments, the one or more reference signals are configured as spatial relation for the one or more channels that include one or more physical uplink control channels (PUCCHs) or one or more physical uplink shared channels (PUSCHs).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
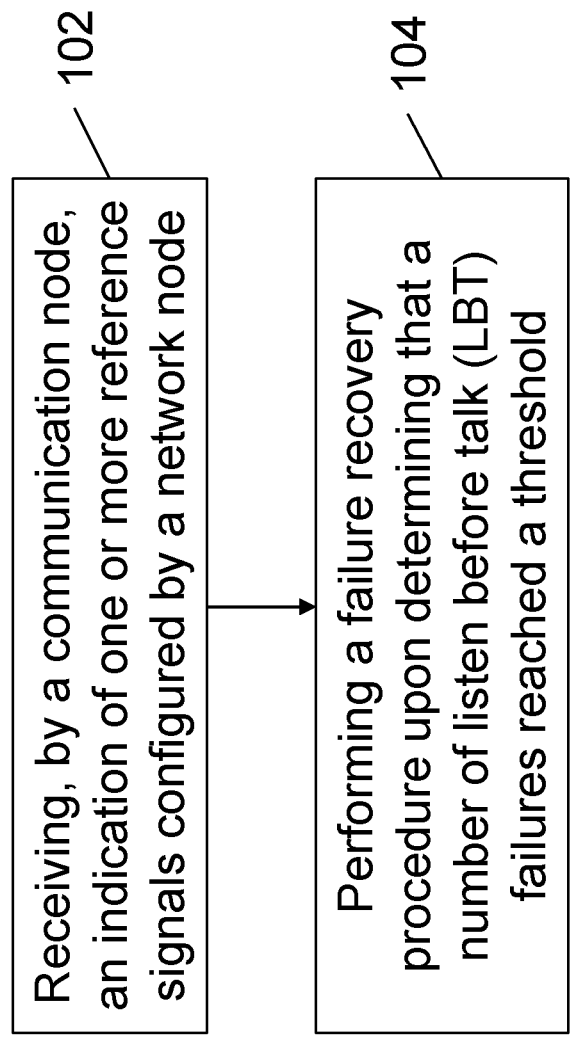
FIGS. 1 and 2 are example flowcharts for Listen Before Talk (LBT) techniques.

Introduction for Listen Before Talk (LBT) Technology

Directional beam technology is being developed for new wireless technologies, such as for wireless communications operating at or above 52.6 GHz. If directional beam is supported, a per beam listen before talk (LBT) technique may be performed for each transmission. In such a scenario, the LBT outcome of each beam may be different so that the channel status of each beam may be different. In Rel-16 New Radio Unlicensed (NR-U), since omnidirectional LBT is performed, a number of LBT failures is counted for all uplink (UL) transmissions regardless of which beam(s) is used. If per beam LBT is performed and channel status of each beam is different, some enhancements need to be considered for LBT failure detection procedure. This patent document describes example LBT schemes for directional beam.

If per beam LBT is supported, since channel status of each beam may be different, LBT failure statistics per beam may be needed. For all UL transmissions, multiple different beams may be used. Which beams are counted may need to be considered. A scheme similar to radio link monitoring (RLM) or beam failure detection (BFD) may be used. For example, gNB configures the detected beams, such as sounding reference signal (SRS). Once LBT failures for all configured beams occur within one period, a LBT failure indication is informed to the higher layer. When the higher layer receives the LBT failure indication from the lower layer, LBT counter will be incremented and LBT failure timer will be started/restarted. When the detected beams are not configured, beams indicated for physical uplink control channel (PUCCH) transmission may be used for LBT failure statistics.

In Rel-16 NR-U, Received Signal Strength Indicator (RSSI) measurement is introduced so that the UE can measure RSSI for all directions in the configured measurement bandwidth over N number of resource blocks corresponding to LBT bandwidth with the center frequency of configured absolute radio frequency channel number (ARFCN). When per beam LBT is supported, some enhancements need to be considered for RSSI. This patent document also describes some example schemes for performing per beam RSSI.

If directional LBT is performed, RSSI measurement result per beam can be beneficial for selecting a beam. If RSSI measurement per beam is supported, some issues need to be considered, such as measurement reporting, measurement result and RSSI value derivation. For measurement reporting configuration, in order to report channel occupancy rate, channel occupancy threshold needs to be configured. This threshold may be configured per beam or per frequency. For measurement result reporting, RSSI per beam can be different from RSRP/RSRQ/SINR per beam, so that RSSI can be reported per beam per frequency not per cell. For RSSI value per beam, multiple measurement values within report interval can be received. When reporting is triggered, multiple measurement values may be linear average or filtered similar to RSRP/RSRQ/SINR.

Another issue with LBT technology is about contention exempt short control signaling. In R17, some agreements for short control signaling include that the contention exempt short control signaling rules apply to a transmission of msg1 for the 4 step RACH and MsgA for the 2-step RACH for all supported subcarrier spacing (SCS), and that, for example, 10% in any 100 ms interval restriction is applicable to all available msg1/MsgA resources configured (not limited to the resources actually used) in a cell. The 10% in any 100 ms interval is restricted from the resource configuration for a certain equipment. Thus, up to 10% of the 100 ms interval may be used by a UE to transmit short control signaling to the base station. According to the current agreement, only msg1/MsgA resource configuration is counted. If multiple UL transmissions are considered as contention exempt short control signaling, such as SRS, PUCCH, it can be easy to exceed 10% over 100 ms interval for theses short control signaling configuration statistics. Thus, this patent document also describes example schemes for determining the usage of short control signaling.

According to ETSI regulation, within an observation period of 100 ms, 10% over 100 ms interval restriction is applicable to short control signaling transmissions. These short control signaling may be all available short control signaling resources configured, such as Msg1, Msg3, MsgA, SRS, PUCCH and PUSCH without user plane data. If short control signaling resources above are configured, it is very easy to exceed the 10% over 100 ms interval restriction. If they exceed 10% restriction, transmission of which short control signaling resources do not need LBT needs to be considered. For this issue, one possible scheme is that a priority for these short control signaling is defined. For example, Msg1 has higher priority than SRS. If total time of available Msg1 resource configured exceed 10 ms, LBT can be performed before SRS transmission.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Embodiment 1

If directional LBT is supported, since channel status of each beam may be different, LBT failure calculation per beam may be needed. For all UL transmissions, used beams may be different and which beams are used to calculate LBT failure needs to be considered. For the various embodiments described in this patent document, the term "firstly" can indicate one or more operations performed before one or more operations described for the term "secondly."

Firstly, the gNB can configure the one or more detected beams, such as one or more SRS. For the physical layer, when LBT failures for all configured detected beams occur within one period, a LBT failure indication is informed to the higher layer. The period may be the maximum value among multiple SRS resource periods or a certain defined value (e.g., a predefined value). An LBT failure is detected by the UE upon determined that an LBT operation has failed for transmitting SRS. For a certain beam direction, reference signal (RS) (e.g., SRS) or PUSCH or PUCCH may be transmitted. Before RS or PUSCH or PUCCH transmission, the UE performs an LBT operation. If the UE determines that the LBT operation fails, then the UE does not transmit the RS or PUSCH or PUCCH.

Secondly, when LBT failure indication is received from the lower layer, LBT counter is incremented by a value (e.g., 1) and LBT failure timer is started/restarted. Once the UE determines or judges that LBT failure counter reaches a threshold, the UE performs the LBT failure recovery procedure. For recovery procedure, two options are as below:

Option 1: LBT failure recovery procedure is triggered. For primary cell of a master or secondary cell group (SpCell), the UE switches to one or more other BWPs with random access channel (RACH) resources. Once the UE determines that consistent LBT failure is detected on all BWPs with RACH resources, LBT failure indication is informed by the UE to the upper layer, such as RRC layer. For secondary cell (SCell), LBT failure can be informed by the UE to gNB via MAC CE.

Option 2: Beam failure recovery procedure is triggered. For SpCell, random access procedure is triggered. For SCell, available beam can be informed by the UE to gNB.

When the detected beams are not configured, the beams to be used by PUCCH or physical uplink shared channel (PUSCH) may be used as detected beams. If multiple beams are used, the UE may select a few beams of them, such as 2 different beams.

Embodiment 2

If directional LBT is supported, since channel status of each beam may be different, LBT failure calculation per beam may be needed. The channel status of the beam direction may be determined by RS transmission. For all UL transmissions, used beams may be different and which beams are used to calculate LBT failure needs to be considered.

Firstly, the detected beams can be configured by gNB, such as SRS. For the physical layer, LBT failure indication is informed to the higher layer when LBT failure for these detected beams occurs.

Secondly, in MAC layer, when LBT failures for all detected beams are received, LBT failure counter is incremented by a value (e.g., 1) and LBT failure timer is started/restarted. When the UE determines that LBT failure timer expires, LBT failure counter is set 0 by the UE. When the UE determines that LBT failure counter reaches a threshold, the UE performs LBT failure recovery procedure. For recovery procedure, two options are as below:

Option 1: LBT failure recovery procedure is triggered. For SpCell, the UE switches to other BWPs with RACH resources. Once the UE determines that LBT failure is triggered on all BWPs with RACH resources, LBT failure indication is informed by the UE to the higher layer, such as RRC layer. For SCell, LBT failure is informed by the UE to gNB via MAC CE.

Option 2: Beam failure recovery procedure is triggered. For SpCell, random access procedure is triggered. For SCell, candidate beam is informed by the UE to gNB.

When the detected beams are not configured, some beams to be used by PUCCH or PUSCH may be used as detected beams. If multiple beams are used, the UE may select a few beams of them, such as 2 different beams.

FIG. 1 shows an example flowchart for an LBT technique as explained at least in Embodiment 1 and/or Embodiment 2. Operation 102 includes receiving, by a communication node, an indication of one or more reference signals configured by a network node. Operation 104 includes performing a failure recovery procedure upon determining that a number of listen before talk (LBT) failures reached a threshold, wherein the communication node determines that an LBT failure has occurred in response to determining that an LBT operation has failed for transmitting, in an active bandwidth part (BWP), a beam that includes a reference signal from the one or more reference signals.

In some embodiments, the communication node performs the failure recovery procedure by selecting other BWPs with random access channel (RACH) resources to transmit information. In some embodiments, the method further includes determining that an LBT failure has occurred in the other BWPs in response to determining that the LBT operation has failed for transmitting, in each of the other BWPs, a beam that includes a reference signal from the one or more reference signals; and transmitting, by the communication node and in response to the determining, a message to the network node, wherein the message indicates that LBT failures are detected on a plurality of BWPs comprising the active BWP and the other BWPs. In some embodiments, the communication node performs the failure recovery procedure by performing random access. In some embodiments, the communication node performs the random access using a transmission beam indicated by the network node to the communication node. In some embodiments, the one or more reference signals include one or more sounding reference signals (SRSs).

Embodiment 3

If directional LBT is supported, since channel status of each beam may be different, LBT failure calculation per beam may be needed. For all UL transmissions, used beams may be different and which beams are used to calculate LBT failure needs to be considered.

Firstly, the detected beams can be selected by the UE based on the beams used by SRS, PUCCH or PUSCH. For the physical layer, when the UE determines that LBT failures for all selected beams occur within one period, a LBT failure indication is informed by the UE to the higher layer. The period may be the maximum value among multiple SRS resource periods or a certain defined value (e.g., a predefined value).

Secondly, when LBT failure indication is received from the lower layer, LBT counter is incremented by a value (e.g., 1) and LBT failure timer is started/restarted. Once the UE determines or judges that LBT failure counter reaches a threshold, the UE performs the LBT failure recovery procedure. For recovery procedure, two options are as below:

Option 1: LBT failure recovery procedure is triggered. For SpCell, the UE switches to other BWPs with RACH resources. Once UE determines that consistent LBT failure is triggered on all BWPs with RACH resources, LBT failure indication is informed to the upper layer, such as RRC layer. For SCell, LBT failure is informed to gNB via MAC CE.

Option 2: Beam failure recovery procedure is triggered. For SpCell, random access procedure is triggered. For SCell, available beam is informed by the UE to gNB.

Embodiment 4

If directional LBT is supported, since channel status of each beam may be different, LBT failure calculation per beam may be needed. For all UL transmissions, used beams may be different and which beams are used to calculate LBT failure needs to be considered.

Firstly, the detected beams can be selected by the UE based on the used beams used by SRS, PUCCH or PUSCH. For the physical layer, LBT failure indication is informed by the UE to the higher layer when the UE determines that LBT failure for these detected beams occurs.

Secondly, in MAC layer, when LBT failures for all detected beams are received, LBT failure counter is incremented by a value (e.g., 1) and LBT failure timer is started/restarted. Once the UE determines that LBT failure timer expires, LBT failure counter is set 0 by the UE. Once the UE determines or judges that LBT failure counter reaches a threshold, the UE performs the LBT failure recovery procedure. For recovery procedure, two options are as below:

Option 1: LBT failure recovery procedure is triggered. For SpCell, the UE switches to other BWPs with RACH resources. Once the UE determines that LBT failure is triggered on all BWPs with RACH resources, LBT failure indication is informed to the higher layer, such as RRC layer. For SCell, LBT failure is informed by the UE to gNB via MAC CE.

Option 2: Beam failure recovery procedure is triggered. For SpCell, random access procedure is triggered. For SCell, candidate beam is informed by the UE to gNB.

Figure 2:
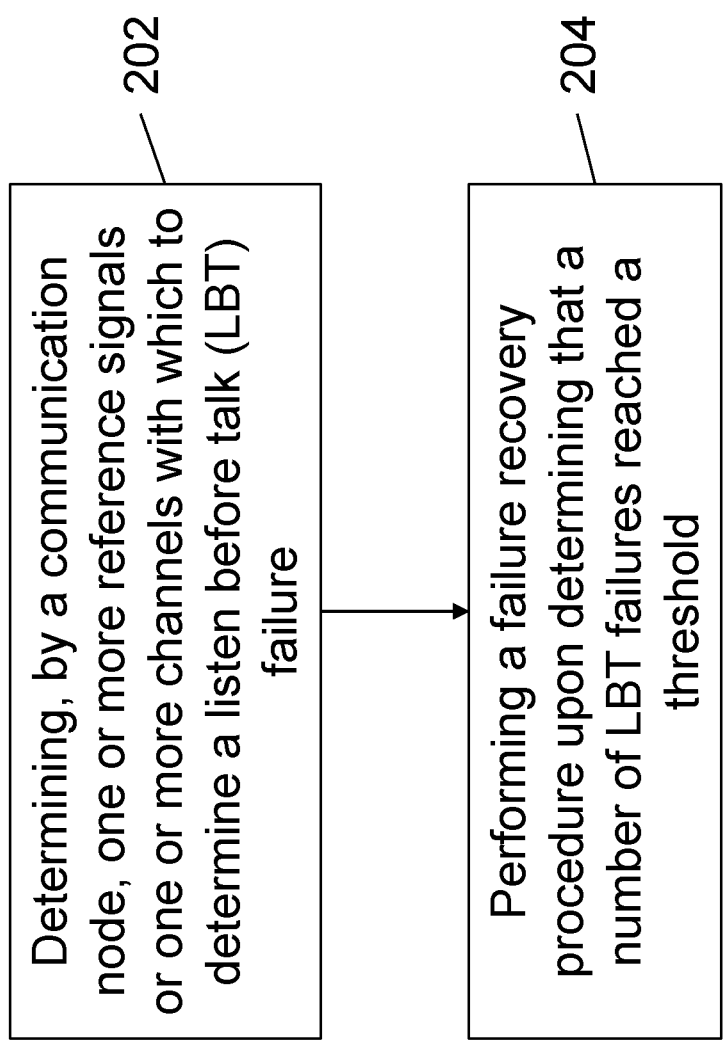

FIG. 2 shows an example flowchart for an LBT technique as explained at least in Embodiment 3 and/or Embodiment 4. Operation 202 includes determining, by a communication node, one or more reference signals or one or more channels with which to determine a listen before talk (LBT) failure. Operation 204 includes performing a failure recovery procedure upon determining that a number of LBT failures reached a threshold, wherein the communication node determines that an LBT failure has occurred in an active bandwidth part (BWP) in response to: (1) determining that an LBT operation has failed for and transmitting, in an active bandwidth part (BWP), a first beam that includes a reference signal from the one or more reference signals, or (2) determining that the LBT operation has failed for transmitting, in the active BWP, a second beam corresponding to a channel from the one or more channels.

In some embodiments, the communication node performs the failure recovery procedure by selecting other BWPs with random access channel (RACH) resources to transmit information. In some embodiments, the method further includes determining that an LBT failure has occurred in the other BWPs in response to determining that the LBT operation has failed for transmitting, in each of the other BWPs, a beam that (1) includes a reference signal from the one or more reference signals or (2) corresponds to a channel from the one or more channels; and transmitting, by the communication node and in response to the determining, a message to the network node, wherein the message indicates that LBT failures are detected on a plurality of BWPs comprising the active BWP and the other BWPs. In some embodiments, the communication node performs the failure recovery procedure by performing random access. In some embodiments, the communication node performs the random access using a transmission beam indicated by the network node to the communication node. In some embodiments, the one or more reference signals include one or more sounding reference signals (SRSs). In some embodiments, the one or more reference signals are configured as spatial relation for the one or more channels that include one or more physical uplink control channels (PUCCHs) or one or more physical uplink shared channels (PUSCHs).

Embodiments 5

If directional LBT is performed, RSSI measurement per beam is beneficial to some procedures, such as handover. If RSSI measurement per beam is supported, some issues may need to be considered, such as measurement reporting, measurement result and/or RSSI value derivation.

For measurement reporting configuration, in order to report channel occupancy rate, channel occupancy threshold may need to be configured. This threshold may be configured per beam and/or per frequency. The following three options are as below for this threshold.

Option 1: it is per frequency
Option 2: it is per beam
Option 3: per frequency and per beam.

For Option 1, a separate threshold is configured for channel occupancy calculation, or the current threshold configured for channel occupancy of omnidirectional measurement.

For Option 2, for each beam, a threshold is configured.

For Option 3, threshold per frequency is mandatory and threshold per beam is optional. If threshold per beam is not configured, threshold per frequency will be used. If threshold per beam is not configured, threshold per frequency will be used.

For Options 1-3, if the UE determines a number of beams having RSSI values that are higher than the threshold value, then the UE may (1) include in the measurement report sent to the base station an average of the RSSI values of the number of beams, and/or (2) include in the measurement report the channel occupancy rate which can be a percentage of the number of beams having RSSI values greater than the threshold value divided by the total number of beams.

Embodiment 6

If directional LBT is performed, RSSI measurement per beam is beneficial to some procedures, such as handover. If RSSI measurement per beam is supported, some issues may need to be considered, such as measurement reporting, measurement result and/or RSSI value derivation.

For measurement result reporting, RSSI per beam is different from RSRP/RSRQ/SINR per beam, it should be per beam per frequency not per cell. Hence for measurement result configuration, RSSI result may not be related to cell. A possible configuration scheme is as below:

```
-- ASN1START
-- TAG-MEASRESULTS-START
MeasResults ::=                    SEQUENCE {
  measId                             MeasId,
  measResultServingMOList            MeasResultServMOList,
  measResultNeighCells               CHOICE {
    measResultListNR                   MeasResultListNR,
    ...,
    measResultListEUTRA                MeasResultListEUTRA,
    measResultListUTRA-FDD-r16         MeasResultListUTRA-FDD-r16
}                                    OPTIONAL,
  ...,
[[
```

-continued

```
    measResultServFreqListEUTRA-SCG           MeasResultServFreqListEUTRA-SCG
OPTIONAL,
    measResultServFreqListNR-SCG              MeasResultServFreqListNR-SCG
OPTIONAL,
    measResultSFTD-EUTRA                      MeasResultSFTD-EUTRA
OPTIONAL,
    measResultSFTD-NR                         MeasResultCellSFTD-NR
OPTIONAL
    ]],
    [[
    measResultCellListSFTD-NR                 MeasResultCellListSFTD-NR
OPTIONAL
    ]],
    [[
    measResultForRSSI-r16                     MeasResultForRSSI-r16
OPTIONAL,
    locationInfo-r16                          LocationInfo-r16
OPTIONAL,
    ul-PDCP-DelayValueResultList-r16          UL-PDCP-DelayValueResultList-r16
OPTIONAL,
    measResultsSL-r16                         MeasResultsSL-r16
OPTIONAL,
    measResultCLI-r16                         MeasResultCLI-r16
OPTIONAL,
    ]]
    measResultRSSI-r17                        MeasResultRSSI-r17
OPTIONAL
}
MeasResultRSSI-r17 ::=          SEQUENCE {
    rssiResultsSSB-Indexes-r17                RSSIResultsPerSSB-IndexList-r17
OPTIONAL,
    rssiResultsCSI-RS-Indexes-r17             RSSIResultsPerCSI-RS-IndexList-r17
OPTIONAL
}
RSSIResultsPerSSB-IndexList-r17::= SEQUENCE (SIZE (1..maxNrofIndexesToReport2)) OF
RSSIResultsPerSSB-Index-r17
RSSIResultsPerCSI-RS-IndexList-r17::= SEQUENCE (SIZE (1..maxNrofIndexesToReport2))
OF RSSIResultsPerCSI-RS-Index-r17
RSSIResultsPerSSB-Index-r17 ::=           SEQUENCE {
    ssb-Index-r17                             SSB-Index,
    rssi-Result-r17                           RSSI-Range-r16,
    channelOccupancy-r17                      INTEGER (0..100)
}
RSSIResultsPerCSI-RS-Index-r17::=             SEQUENCE {
csi-RS-Index                                  CSI-RS-Index,
    rssi-Result-r17                           RSSI-Range-r16,
    channelOccupancy-r17                      INTEGER (0..100)
}
```

Embodiment 7

If directional LBT is performed, RSSI measurement per beam is beneficial to some procedures, such as handover. If RSSI measurement per beam is supported, some issues may need to be considered, such as measurement reporting, measurement result and RSSI value derivation.

For RSSI result per beam, the UE derives layer 3 filtered value or linear average value based on SS/PBCH block or CSI-RS. For channel occupancy per beam, the UE may calculate the rounded percentage of sample values are greater than or equal to channel occupancy threshold within all the sample values in one period or report interval.

Embodiment 8

According to ETSI regulation, within an observation period of 100 ms, 10% over 100 ms interval restriction is applicable to short control signaling transmissions. These short control signaling may be all available short control signaling resources configured, such as Msg1, Msg3, MsgA, SRS, PUCCH and PUSCH without user plane data.

If short control signaling resources are configured and they exceed 10% restriction, transmission of which short control signaling resources do not need LBT may need to be considered. One possible scheme is that a priority for these short control signaling is defined. For example, in some embodiments, the priority order (from highest priority to lowest priority) may be as follows: Msg1, MsgA, Msg3, SRS, PUCCH and PUSCH without user plane data. In some embodiments, for the priority of Msg1 and MsgA, there may be the following three different options:

Option 1: the priority of Msg1 is equal to that of MsgA;
    Option 2: the priority of MsgA is higher than that of Msg1;
    Option 3: the priority of Msg1 is higher than that of MsgA.

If the UE determines that the total time of available short control signaling resources exceed a certain time value (e.g., 10 ms=10% over 100 ms interval restriction), the UE performs transmission of the higher priority short control signaling without performing LBT.

For the equal priority short control signaling, such as Msg1 and MsgA, if the total time of Msg1 and MsgA exceed the certain time value, for example 10% over 100 ms interval, then in this example, 10 ms is applicable to the actual transmission of Msg1 and MsgA.

For Msg3, since it is scheduled based on the preamble transmission, it may not belong to the configured resources.

Hence, actual transmission for Msg3 may need to be considered, which may enable the UE to transmit other low priority short control signaling by performing LBT before transmission.

When 10 ms time is exceeded for transmission of short control signals, then LBT needs to be performed before using leftover configured resources. For example, if a plurality of short control signaling are configured and if the UE determines that the transmission time for the plurality of short control signaling exceeds 10 ms threshold, then the UE can perform LBT only for a portion of the short control signaling that exceeds 10 ms.

Figure 3:
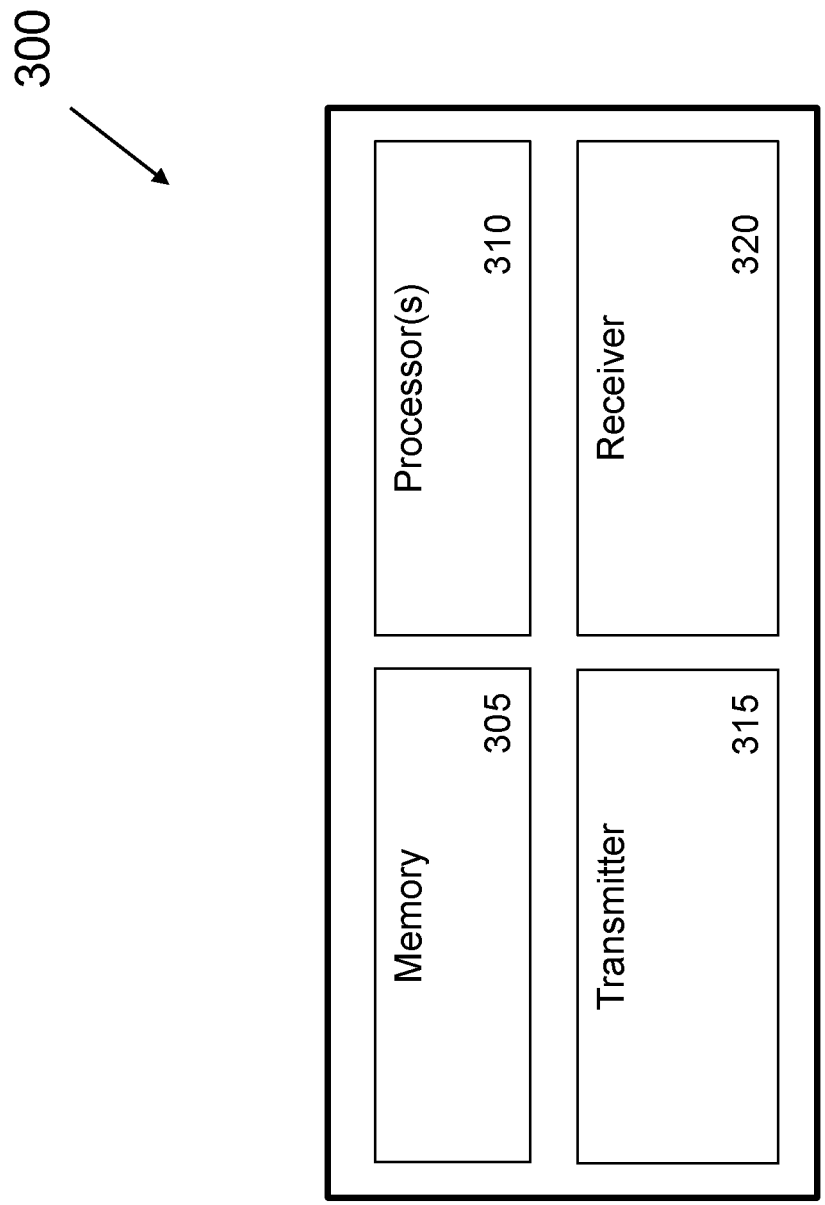
FIG. 3 shows an exemplary block diagram of a hardware platform that may be a part of a network node or a user equipment.

FIG. 3 shows an exemplary block diagram of a hardware platform 300 that may be a part of a network node or a user equipment. The hardware platform 300 includes at least one processor 310 and a memory 305 having instructions stored thereupon. The instructions upon execution by the processor 310 configure the hardware platform 300 to perform the operations described in FIGS. 1, 2, and 4, and in the various embodiments described in this patent document. The transmitter 315 transmits or sends information or data to another node. For example, a network node transmitter can send a message to a user equipment. The receiver 320 receives information or data transmitted or sent by another node. For example, a user equipment can receive a message from a network node.

Figure 4:
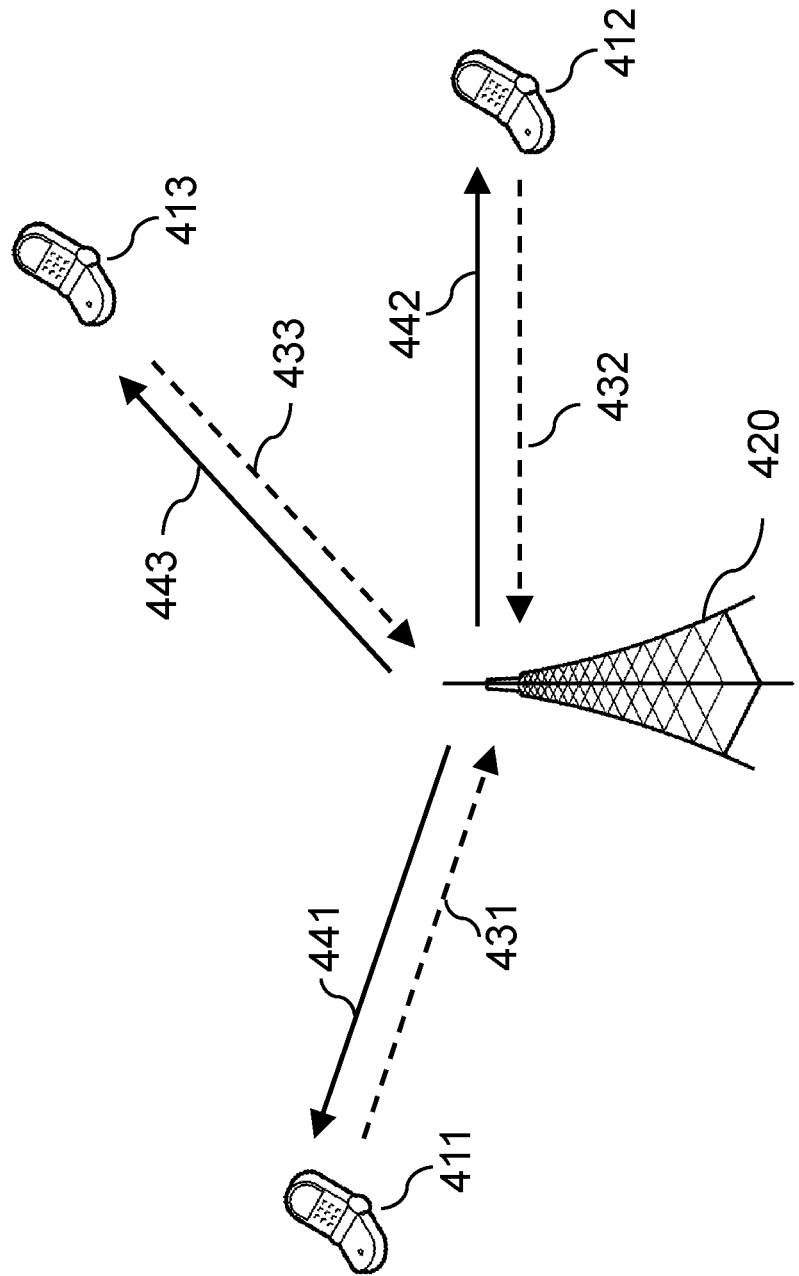
FIG. 4 shows an example of wireless communication including a base station (BS) and user equipment (UE) based on some implementations of the disclosed technology.

The implementations as discussed above will apply to a wireless communication. FIG. 4 shows an example of a wireless communication system (e.g., a 5G or NR cellular network) that includes a base station 420 and one or more user equipment (UE) 411, 412 and 413. In some embodiments, the UEs access the BS (e.g., the network) using a communication link to the network (sometimes called uplink direction, as depicted by dashed arrows 431, 432, 433), which then enables subsequent communication (e.g., shown in the direction from the network to the UEs, sometimes called downlink direction, shown by arrows 441, 442, 443) from the BS to the UEs. In some embodiments, the BS send information to the UEs (sometimes called downlink direction, as depicted by arrows 441, 442, 443), which then enables subsequent communication (e.g., shown in the direction from the UEs to the BS, sometimes called uplink direction, shown by dashed arrows 431, 432, 433) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   determining, by a communication node, one or more reference signals or one or more channels with which to determine a listen before talk (LBT) failure;
   performing a failure recovery procedure upon determining that a number of LBT failures reached a threshold, wherein the communication node determines that an LBT failure has occurred in an active bandwidth part (BWP) in response to:
   (1) determining that an LBT operation has failed for transmitting, in an active bandwidth part (BWP), a first beam that includes a reference signal from the one or more reference signals, or (2) determining that the LBT operation has failed for transmitting, in the active BWP, a second beam corresponding to a channel from the one or more channels; and in response to the number of LBT failures reaching the threshold within a period, informing, by a physical layer of the communication node, to a higher layer of the communication node, an LBT failure indication, wherein the period is a maximum value among multiple sounding reference signal (SRS) periods.

2. The method of claim 1, wherein the communication node performs the failure recovery procedure by selecting other BWPs with random access channel (RACH) resources to transmit information.

3. The method of claim 2, further comprising:
determining that an LBT failure has occurred in the other BWPs in response to determining that the LBT operation has failed for transmitting, in each of the other BWPs, a beam that (1) includes a reference signal from the one or more reference signals or (2) corresponds to a channel from the one or more channels; and
transmitting, by the communication node and in response to the determining that the LBT failure has occurred, a message to a network node, wherein the message indicates that LBT failures are detected on a plurality of BWPs comprising the active BWP and the other BWPs.

4. The method of claim 1, wherein the communication node performs the failure recovery procedure by performing random access.

5. The method of claim 4, wherein the communication node performs the random access using a transmission beam indicated by a network node to the communication node.

6. The method of claim 1, wherein the one or more reference signals include one or more sounding reference signals (SRSs).

7. The method of claim 1, wherein the one or more reference signals are configured as spatial relation for the one or more channels that include one or more physical uplink control channels (PUCCHs) or one or more physical uplink shared channels (PUSCHs).

8. An apparatus for wireless communication comprising at least one processor, configured to implement a method, comprising:
determine, by a communication node, one or more reference signals or one or more channels with which to determine a listen before talk (LBT) failure;
perform a failure recovery procedure upon determining that a number of LBT failures reached a threshold, wherein the communication node determines that an LBT failure has occurred in an active bandwidth part (BWP) in response to:
(1) determining that an LBT operation has failed for transmitting, in an active bandwidth part (BWP), a first beam that includes a reference signal from the one or more reference signals, or
(2) determining that the LBT operation has failed for transmitting, in the active BWP, a second beam corresponding to a channel from the one or more channels; and
in response to the number of LBT failures reaching the threshold within a period, inform, by a physical layer of the communication node, to a higher layer of the communication node, an LBT failure indication, wherein the period is a maximum value among multiple sounding reference signal (SRS) periods.

9. The apparatus of claim 8, wherein the communication node performs the failure recovery procedure by selecting other BWPs with random access channel (RACH) resources to transmit information.

10. The apparatus of claim 9, wherein the at least one processor is further configured to:
determine that an LBT failure has occurred in the other BWPs in response to determining that the LBT operation has failed for transmitting, in each of the other BWPs, a beam that (1) includes a reference signal from the one or more reference signals or (2) corresponds to a channel from the one or more channels; and
transmit, by the communication node and in response to the determine that the LBT failure has occurred, a message to a network node, wherein the message indicates that LBT failures are detected on a plurality of BWPs comprising the active BWP and the other BWPs.

11. The apparatus of claim 8, wherein the communication node performs the failure recovery procedure by performing random access.

12. The apparatus of claim 11, wherein the communication node performs the random access using a transmission beam indicated by a network node to the communication node.

13. The apparatus of claim 8, wherein the one or more reference signals include one or more sounding reference signals (SRSs).

14. The apparatus of claim 8, wherein the one or more reference signals are configured as spatial relation for the one or more channels that include one or more physical uplink control channels (PUCCHs) or one or more physical uplink shared channels (PUSCHs).

15. A non-transitory computer readable program storage medium having code stored thereon, the code, when executed by a processor, causing the processor to implement a method, comprising:
determining, by a communication node, one or more reference signals or one or more channels with which to determine a listen before talk (LBT) failure;
performing a failure recovery procedure upon determining that a number of LBT failures reached a threshold, wherein the communication node determines that an LBT failure has occurred in an active bandwidth part (BWP) in response to:
(1) determining that an LBT operation has failed for transmitting, in an active bandwidth part (BWP), a first beam that includes a reference signal from the one or more reference signals, or
(2) determining that the LBT operation has failed for transmitting, in the active BWP, a second beam corresponding to a channel from the one or more channels; and
in response to the number of LBT failures reaching the threshold within a period, informing, by a physical layer of the communication node, to a higher layer of the communication node, an LBT failure indication, wherein the period is a maximum value among multiple sounding reference signal (SRS) periods.

16. The non-transitory computer readable program storage medium of claim 15, wherein the communication node performs the failure recovery procedure by selecting other BWPs with random access channel (RACH) resources to transmit information.

17. The non-transitory computer readable program storage medium of claim 16, wherein the method further comprises:

determining that an LBT failure has occurred in the other BWPs in response to determining that the LBT operation has failed for transmitting, in each of the other BWPs, a beam that (1) includes a reference signal from the one or more reference signals or (2) corresponds to a channel from the one or more channels; and transmitting, by the communication node and in response to the determining that the LBT failure has occurred, a message to a network node, wherein the message indicates that LBT failures are detected on a plurality of BWPs comprising the active BWP and the other BWPs.

18. The non-transitory computer readable program storage medium of claim 15, wherein the communication node performs the failure recovery procedure by performing random access.

19. The non-transitory computer readable program storage medium of claim 18, wherein the communication node performs the random access using a transmission beam indicated by a network node to the communication node.

20. The non-transitory computer readable program storage medium of claim 15, wherein the one or more reference signals include one or more sounding reference signals (SRSs).

* * * * *